(12) United States Patent
Iizuka et al.

(10) Patent No.: US 6,424,833 B1
(45) Date of Patent: Jul. 23, 2002

(54) MOBILE COMMUNICATION SYSTEM AND A HAND-OFF METHOD THEREOF

(75) Inventors: Hiromi Iizuka; Hirofumi Shiotsuki; Makoto Aihara, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/338,607

(22) Filed: Jun. 23, 1999

(30) Foreign Application Priority Data

Jun. 25, 1998 (JP) .......................................... 10-179117

(51) Int. Cl.[7] .............................. H04Q 7/20; H04Q 7/30; H04Q 7/32
(52) U.S. Cl. ........................ 455/436; 455/437; 455/438; 455/439; 455/442; 455/443; 370/328; 370/329; 370/331; 370/332
(58) Field of Search .............................. 455/226.2, 434, 455/436, 442, 439, 440, 443, 515, 550, 561, 435, 437, 438, 441, 444, 422; 370/328, 329, 331, 332, 333, 334

(56) References Cited

U.S. PATENT DOCUMENTS

| | | | | |
|---|---|---|---|---|
| 5,444,766 A | * | 8/1995 | Farwell et al. | 455/436 |
| 5,517,674 A | * | 5/1996 | Rune | 455/436 |
| 5,854,981 A | * | 12/1998 | Wallstedt et al. | 455/439 |
| 6,064,890 A | * | 5/2000 | Hirose et al. | 455/513 |
| 6,188,904 B1 | * | 2/2001 | Marsan | 455/437 |

\* cited by examiner

Primary Examiner—William Trost
Assistant Examiner—Keith Ferguson
(74) Attorney, Agent, or Firm—Young & Thompson

(57) ABSTRACT

A mobile communication system, which is capable of improving a hand-off success rate of a mobile terminal moving in a high speed, and also capable of improving a process capability of a base station during hand-off control operation, is realized. When the mobile terminal, which has moved from one cell to another cell during communication, receives a hand-off instruction signal from a hand-off control unit of a mobile switching center, an electric field level measurement stopping unit stops the electric field level measurement of the forward control channels of the adjoining base stations which has instructed from the original hand-off base station, and also stops the transmission of the electric field level measurement result signal.

5 Claims, 3 Drawing Sheets

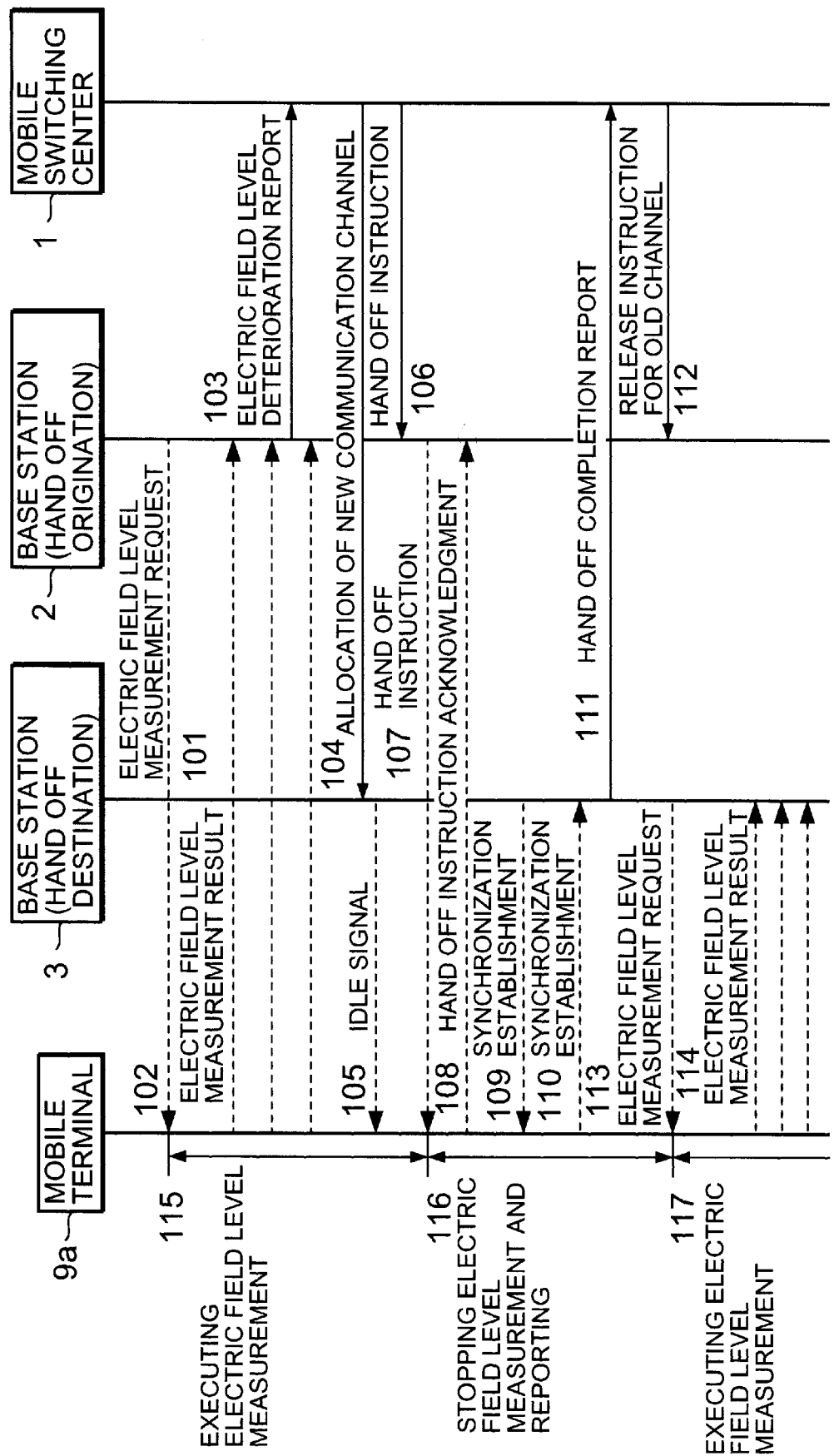

MOBILE COMMUNICATION SYSTEM AND A HAND-OFF METHOD THEREOF

BACKGROUND OF THE INVENTION

1. Field of the Invention

The present invention relates to a mobile communication system and a hand-off method used in the mobile communication system.

2. Description of the Related Art

An electric field level measurement at a mobile terminal and a hand-off method in accordance with the result of the measurement carried out in a mobile communication system will be explained with referring to FIG. 2 which shows an example of constitution of the mobile communication system. A description will be made for the mobile communication system designed based upon the TIA/EIA-627 (telecommunications industry association/electronic industry association) specifications.

In FIG. 2, the mobile communication system designed based on the TIA/EIA-627 specifications corresponds to a cellular type mobile communication system. A communication service area by the cellular type mobile communication system comprises a plurality of cells 20, 30, 40, 50, 60, 70 and 80. Base stations 2, 3, 4, 5, 6, 7 and 8 are arranged in each of the cells 20, 30, 40, 50, 60, 70 and 80 for providing radio communication with mobile terminals existing in each cell. In this drawing, only 7 cells are shown, however, in an actual case, a large number of cells are constituting communication service area. Control channels having different frequencies from each other are allocated to the adjoining base stations. Each of these base stations 2, 3, 4, 5, 6, 7 and 8 is connected to a mobile switching center 1 by way of transmission lines including a control signal line and a communication line. In this mobile communication system, there are plural mobile terminals 9a to 9m freely moving through the above-explained cell groups.

Now, a mobile terminal 9a is located in the cell 20, and is in a standby state while being tuned to a forward control channel transmitted from the base station 2, and waiting for a call origination by a user of this mobile terminal or a call termination from the base station. At this time, when this mobile terminal 9a executes either a call originating operation or a call receiving operation, an idle communication channel of the base station 2 is allocated for the call by a control operation of the mobile switching center 1 via the transmission line 10, so that a communication service may be provided.

When the communication service is commenced, the base station 2 edits an electric field level measurement request signal obtained from a forward control channel list of the adjoining base stations provided in this base station 2. Then, this base station 2 transmits the electric field level measurement request signal to the mobile terminal 9a. In other words, the radio signal frequencies of the control channels which are allocated to the respective cells 30 and 40 of the base stations 3 and 4 located adjacent to the base station 2 are contained in the electric field level measurement request signal. The resulting electric field level measurement request signal is notified to the mobile terminals 9a.

While continuing the communication service, the mobile terminal 9a periodically measures electric field levels of the forward control channels of the adjoining base stations 3 and 4 by tuning respective radio signal frequencies notified by the received electric field level measurement request signal. Then, the mobile terminals 9a produces an electric level measurement result signal by editing the measured electric field levels of the forward control channels of the adjoining base stations 3 and 4 and an electric field level of the forward communication channel under use for the current communication with the base station 2. This electric field level measurement result signal is periodically transmitted to the base station 2 from the mobile terminal 9a.

The base station 2 compares the electric field level of the forward communication channel, which is used in the current communication, included in the electric field level measurement result signal transmitted from the mobile terminal 9a with a predetermined threshold value. This threshold value is defined as a minimum electric field level value at which a mobile terminal can continue a communication with a base station in the cell.

When the electric field level measurement value of the forward communication channel used in the current communication becomes smaller than, or equal to the threshold value, namely, is deteriorated, the base station 2 judges that the mobile terminal 9a is located at a boundary area of the cell 20. Then, this base station 2 edits both this electric field level measurement value and the electric field level measurement values of the forward control channels of the adjoining cells 30 and 40 to thereby produce an electric field level deterioration report signal. The base station 2 transmits this electric field level deterioration report signal to the mobile switching center 1.

In response to the received electric field level deterioration report signal, the mobile switching center 1 refers to a hand-off list provided in the mobile switching center 1 so as to select such an adjoining cell that the electric field level measurement value of the forward control channel being the most optimum value, and executes the hand-off control in such a manner that the current communication by the mobile terminal 9a can be switched and continued by a base station in a selected cell.

In such a conventional mobile communication system, when the mobile terminal 9a, which had been receiving the communication service in the cell 20, has moved into the cell 30 while measuring the electric field levels of the forward control channels of the adjoining base stations 3 and 4 in accordance with the electric field level measurement request signal received from the base station 2, the mobile switching center 1 executes the hand-off control by allocating the idle communication channel available in the hand-off destination base station 3 for continuing the communication service by the mobile terminal 9a.

On the other hand, while holding the forward control channel information of the adjoining base stations 3 and 4, which was instructed by the original hand-off base station 2, the mobile terminal 9a continues the periodical electric field level measurement even after the mobile terminal 9a has moved in the cell 30 of the hand-off destination base station 3, and then reports the electric field level measurement result signal to the hand-off destination base station 3. However, this electric field level measurement result signal is a useless signal with respect to the hand-off destination base station 3, which will transmit the new electric field level measurement request signal to be used in the cell 30.

At this time, it could happen that the hand-off destination base station 3 receives this useless electric field level measurement result signal before transmitting the new electric field level measurement request signal to the mobile terminal 9a so as to measure the electric field levels of the forward control channels of the adjacent base stations 2, 4, 5 and 6. If the electric field level value of the forward communication channel having been used for the communication in the cell 20 is contained in this useless electric field level measurement result signal, and the value indicates deterioration of the signal level of the forward communication channel, the hand-off destination base station 3 produces the electric field level deterioration report to the mobile switching center 1.

However, this electric field level deterioration report is produced in accordance with the wrong report from the mobile terminal 9a, in which the electric field level measurement request has not yet been renewed.

The mobile switching center 1 executes the hand-off control based on the electric field level deterioration report caused by the wrong report, and allocates the idle communication channel of the adjoining base station which is selected as the next hand-off destination base station in accordance with the electric field level measurement values of the forward control channels contained in the received electric field level deterioration report. However, the selected base station does not coincide with such a base station which is to be referred from the hand-off list provided in the mobile switching center 1. As a result, the erroneous hand-off operation is repeatedly carried out. Otherwise, the call being established is interrupted. Accordingly, the communication service cannot be effectively provided.

The electric field level measurement stop signal defined in the TIA/EIA-627 specifications can be applied to avoid above-mentioned problem. However, the following problems will still occur when such an additional signal is introduced. That is, it bear on the hand-off control processing capacity and time. The hand-off success rate with respect to the mobile terminal which is moving in a high speed is lowered, and also, due to increase of the control signals used in the base station, the processing capability is lowered.

An object of the present invention is to solve such conventional problems, and therefore, is to provide a mobile communication system capable of improving a hand-off success rate with respect to a mobile terminal moving in a high speed, and also capable of increasing a processing capability of a base station while executing a hand-off control.

SUMMARY OF THE INVENTION

A mobile communication system, according to the present invention, is featured by comprising a plurality of radio base stations installed in each of plurality of cells, for providing mobile communication services, a mobile switching center connected to the plurality of base stations, for controlling call connections in the mobile communication system, and a plurality of mobile terminals, each includes an electric field level measurement stopping unit which stops an electric level measurement of forward control channels of adjoining base stations when having received a hand-off instruction signal transmitted from the mobile switching center.

The base station also includes an electric field level measurement result discarding unit which discards an electric field level measurement result signal transmitted from the mobile terminal after the hand-off instruction signal having been transmitted to the mobile terminal.

According to the present invention, a hand-off method for a mobile communication system in which a hand-off control is performed based on a deterioration of an electric field level of a communication channel between a base station and a mobile terminal which has measured and reported electric filed levels of forward control channels of adjoining base stations around a cell and the communication channel, the method comprising a step of stopping measurement and reporting, in the mobile terminal, for the electric filed levels of forward control channels of adjoining base stations and the communication channel when a hand-off instruction to another base station is received, and a step of resuming measurement and reporting, in the mobile terminal, for the electric filed levels of forward control channels of new adjoining base stations and new communication channel in accordance with an instruction by new base station of a hand-off destination.

Also, according to the present invention, a hand-off method for a mobile communication system structured by a plurality of radio base stations installed in each of plurality of cells, for providing mobile communication services, a mobile switching center connected to the plurality of base stations, for controlling call connections in the mobile communication system, and a plurality of mobile terminals moving around the plurality of cells and communicating with the base station in each of cells, the method comprising;

(1) instructing the mobile terminal to measure and report each of electric field levels of forward control channels of adjoining base stations around a cell in which the mobile terminal is currently locating, and to measure and report an electric field level of a communication channel used for a current communication with the base station, when a communication between the base station and the mobile terminal is commenced;

(2) requesting a hand-off control to the mobile switching center from the base station when a deterioration of the electric field level of the communication channel having been detected by the electric field level measurement results reported by said mobile terminal;

(3) instructing the mobile terminal to perform a hand-off operation to a base station, whose electric field level of the control channel contained in the electric field level measurement results reported by the mobile terminal is the highest level;

(4) discarding the electric field level measurement results reported from the mobile terminal in said base station after the hand-off instruction having been transmitted to the mobile terminal; and (5) stopping the electric field level measurement and report, having been performed in the mobile terminal, when the hand-off instruction is received from the mobile switching center.

The hand-off method further comprising a step of resuming the electric field level measurement and report, by the mobile terminal, of forward control channels of adjoining base stations around a cell in which the mobile terminal is newly locating, and a communication channel used for new communication with new base station of the hand-off destination, when an electric field level measurement request is instructed from the new base station.

BRIEF DESCRIPTION OF THE DRAWINGS

FIG. 3 shows an operation sequence for hand-off processing in the mobile communication system of the present invention.

DETAILED DESCRIPTION OF PREFERRED EMBODIMENTS

Referring now to drawings, an embodiment of the present invention will be described in detail.

Figure 1:
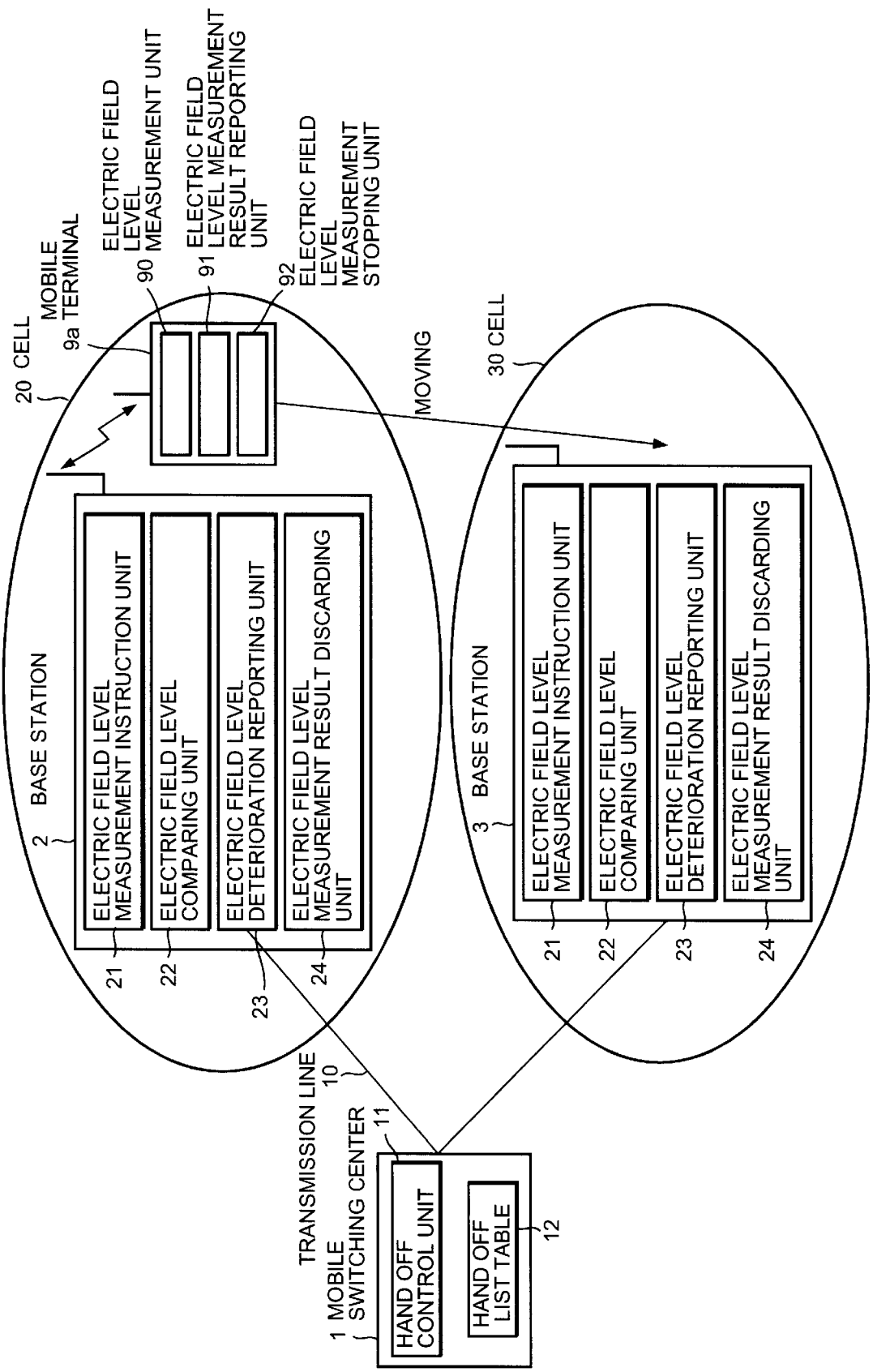
FIG. 1 shows a structural diagram of a mobile communication system according to the present invention.
Figure 2:
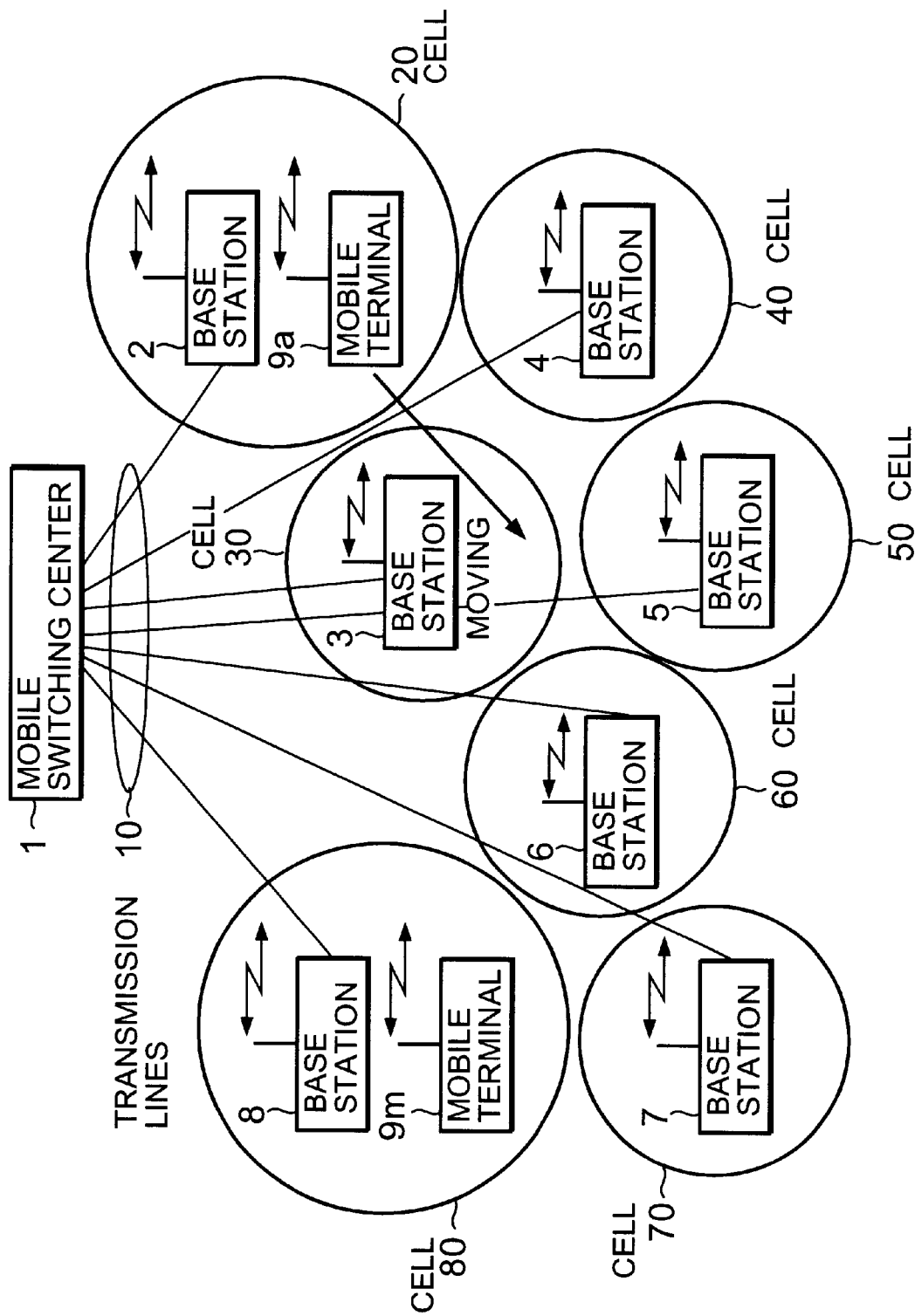
FIG. 2 shows an example of constitution of the mobile communication network.

FIG. 1 shows a structural diagram of a mobile communication system according to the present invention. FIG. 2 shows an example of constitution of the mobile communication network.

As shown in FIG. 2, a communication service area of the mobile communication system comprises a plurality of cells 20, 30, 40, 50, 60, 70 and 80. Base stations 2, 3, 4, 5, 6, 7 and 8 are arranged in each of the cells 20, 30, 40, 50, 60, 70 and 80 for providing radio communication with mobile terminals existing in each cell. Each of these base stations 2, 3, 4, 5, 6, 7 and 8 is connected to a mobile switching center 1 by way of transmission lines including a control signal line and a communication line. In this mobile communication system, there are plural mobile terminals 9a to 9m freely moving through the above-explained cell groups.

As shown in FIG. 1, each of the base stations 2 to 8 according to the present invention contains the following units.

An electric field level measurement instruction unit 21 which transmits an electric field level measurement request signal to a mobile terminal. When a communication with the mobile terminal has commenced by either of a call origination from the mobile terminal or a call termination from the base station in this cell, the base station edits this request signal with referring to a forward control channel list of the adjoining base stations of own cell provided in the base station. The electric field level measurement request signal instructs the mobile terminal to measure an electric field level of respective forward control channels whose radio signal frequencies are indicated in this request signal and a communication channel currently used for the communication with the base station, and to report the measurement result to the base station.

An electric field level comparing unit 22 which compares an electric field level of the communication channel measured at the mobile terminal and contained in an electric field level measurement result signal received from the mobile terminal with a predetermined electric field level threshold value.

An electric field level deterioration reporting unit 23 which transmits an electric field level deterioration report to the mobile switching center 1 when the electric field level of the communication channel measured at the mobile terminal is smaller than, or equal to the electric field level threshold value. The electric field level deterioration report notifies the deterioration of the current communication channel used between the base station and the mobile terminal to the mobile switching center 1 for requesting a hand-off processing, and it includes the electric field levels of the forward control channel of the respective adjoining base stations, which have been reported by the electric field level measurement result signal.

An electric field level measurement result canceling unit 24 which cancels the electric field level measurement result signal when the electric field level measurement value of the communication channel, contained in the electric field level measurement result signal, is higher than the electric field level threshold value. Since the electric field level measurement result canceling means 24 is employed, only the electric field level deterioration report is required as the electric field level measurement value report to the mobile switching center 1. As a result, the processing loads of the base stations and the mobile switching center can be reduced.

The mobile switching center 1 includes a hand-off control unit 11 which refers to a hand-off list table 12 provided in the mobile switching center 1 upon receipt of a electric field level deterioration report from the base station, and transmits a hand-off instruction signal via an (original hand-off) base station, where the mobile terminal has been located, to the mobile terminal in order to perform the hand-off operation for the mobile terminal to such a base station having the most preferable electric field level measurement value of the forward control channel.

The hand-off list table 12 contains identification information for communication channels and a forward control channel with respect to each of the base stations.

Each of the mobile terminals 9a to 9m contains the following units.

An electric field level measuring unit 90 which measures electric field levels of forward control channels of a plurality of adjoining base stations and also for measuring electric field level of the communication channel allocated to the current communication in response to the instruction by the electric field level measurement request signal from the base station under communicating.

An electric field level measurement result reporting unit 91 which edits the electric field level measurement values obtained by the electric field level measurement to an electric field level measurement result signal, and periodically reports the electric field level measurement result signal to the base station.

An electric field level measurement stopping unit 92 which stops the electric field level measurement of the forward control channels of the adjoining base stations and also stops the transmission of the electric field level measurement result signal, by receiving the hand-off instruction signal sent via the base station from the hand-off control unit 11 of the mobile switching center 1.

Next, operations of this embodiment of the present invention will be explained by mainly referring to FIG. 3, which shows an operation sequence of the mobile communication system of the present invention, in connection with FIG. 1 and FIG. 2.

Now, the mobile terminal 9a is locating in the cell 20, and is waiting for a call termination from the mobile switching center 1 while being tuned to a forward control channel of the base station 2. Under this condition, when this mobile terminal 9a executes either a call origination operation by the user or a call receiving operation by a call termination from the mobile switching center 1, an idle communication channel of the base station 2 is allocated by control of the mobile switching center 1, so that a communication service is provided.

When the communication service is commenced, the base station 2 searches the forward control channel list of the adjoining base stations provided in the base station 2. Then, this base station 2 recognizes the base stations 3 and 4 of the cells 30 and 40, which are located adjacent to the cell 20 where the mobile terminal 9a is located. This base station 2 produces an electric field level measurement request signal in which frequency information of the forward control channels of the base stations 3 and 4 is included, and then transmits the electric field level measurement request signal to the mobile terminal 9a (101). These frequencies are allocated to the respective cells 30 and 40 of the base stations 3 and 4, which are located adjacent to the base station 2.

Next, the mobile terminal 9a which receives the electric field level measurement request signal measures electric field levels of the forward control channels of the adjoining base stations 3 and 4 by using the electric field level measurement unit 90 (115). Then, the mobile terminal 9a edits the measured electric field level measurement values of the forward control channels of the adjoining base stations 3 and 4 and the electric field level measurement value of the communication channel used for the current communication so as to produce an electric field level measurement result signal, and periodically transmits this electric field level measurement result signal to the base station 2(102).

Next, the base station 2, which has received the electric field level measurement result signal, compares the electric field level measurement value of the communication channel which is used for the current communication with a predetermined electric field level threshold value by using the electric field level comparing unit 22. A minimum value of an electric field level for maintaining normal grade of communication quality in the cell is set as the electric field level threshold value.

At this time, it is so assumed that as indicated in FIG. 2, the mobile terminal 9a is moving from the cell 20 to the cell 30.

Since the electric field level measurement value of the communication channel used for the current communication becomes lower than, or equal to the electric field level threshold value, namely deteriorated due to moving of the mobile terminal 9a away from the base station 2, the base station 2 judges that the mobile terminal 9a is located in the boundary area of the cell 20. Then, the base station 2 transmits the electric field level deterioration report to the mobile switching center 1 (103) for requesting the hand-off processing, and this electric field level deterioration report includes the electric field level measurement value of the communication channel used for the current communication and the electric field level measurement values of the forward control channels of the adjoining cells 30 and 40. At this time, as to the electric field level measurement values of the forward control channels of the adjoining cells 30 and 40 contained in this electric field level deterioration report, the electric field level measurement value of the cell 30 is higher than that of the cell 40.

The mobile switching center 1, which has received the electric field level deterioration report, performs the hand-off control for the mobile terminal 9a to switch the current communication channel of the base station 2 to an idle communication channel available in the base station 3 (namely, hand-off destination) in order to continuously provide the communication service of the mobile terminal 9a in the next cell 30.

First, the mobile switching center 1 allocates a new communication channel to the base station 3 (hand-off destination) (104), and initiates the base station 3 to be brought into an idle transmission state (105). Thereafter, the mobile switching center 1 transmits a hand-off instruction signal via the base station 2 (namely, hand-off origination) (106) to the mobile terminal 9a (107).

The mobile terminal 9a, which has received the hand-off instruction signal, sends back a hand-off instruction acknowledgement signal to the base station 2 (hand-off origination) (108). Then, the mobile terminal 9a stops the electric field level measurement operations for the forward control channels of the base station 3 (hand-off destination) and the base station 4, which are located adjacent to the base station 2 (hand-off origination) (116). Then, the mobile terminal 9a stops the transmission of the electric field level measurement result signal to the base station 2 (hand-off origination) (116), and executes a tuning process operation to a new communication channel of the base station 3 (hand-off destination).

The base station 3 (hand-off destination) sends a synchronization establishment signal used to confirm that the mobile terminal 9a is tuned over the new communication channel through which the communication service of the mobile terminal 9a can be taken over by allocating the new communication channel (109). When the synchronization establishment response signal is received from the mobile terminal 9a (110), the base station 3 (hand-off destination) transmits a hand-off completion report to the mobile switching center 1 (111).

The mobile switching center 1, which has received the hand-off completion report, instructs the base station 2 (hand-off origination) to release the old communication channel (112), and accomplishes the hand-off control.

Next, the base station 3 (hand-off destination) edits frequencies of the respective forward control channels used in the cells 20, 40, 50, and 60 of the base stations 2, 4, 5, and 6, which are located adjacent to the cell 30, from the forward control channel lists of the adjoining base stations held by the base station 3 to produce an electric field level measurement request signal, and then transmits the electric field level measurement request signal to the mobile terminal 9a (113).

Next, the mobile terminal 9a, which has received the electric field level measurement request signal from the base station 3, updates the forward control channel information of the adjoining base stations stored in the mobile terminal, and executes an electric field level measurement of the forward communication channel which has been newly instructed (117). Then the mobile terminal 9a periodically reports an electric field level measurement result signal to the base station 3 (hand-off destination) (114), and this electric field level measurement result signal is produced by editing the communication channel electric field level measurement value of the base station 3 (hand-off destination), and also the forward control channel electric field level measurement values of the adjoining base stations 2, 4, 5, and 6.

As a result, while the hand-off control operation is carried out, the electric field level measurement of the mobile terminal can be stopped without requiring the electric field level measurement stop signal for instructing stopping of the electric field level measurement.

As foregoing explained, the present invention stops both the electric field level measurement of the communication channel and the electric field level measurement control operation of the forward control channels of the adjoining other base stations when the hand-off instruction signal is received. Therefore, it is possible to avoid such problems that the erroneous hand-off operation is repeatedly carried out, and otherwise, the call under communication is interrupted, and the quality of communication service can be improved. These problems are caused by receiving the useless electric field level measurement result signal. This useless electric field level measurement result signal is generated by the mobile terminal, which has moved into the cell of the hand-off destination base station, immediately after the hand-off operation is performed from the original base station. Also, in accordance with the present invention, since the electric field level measurement control process operation of the mobile terminal can be stopped without using the electric field level measurement stop signal, the following effects can be achieved. That is, the hand-off success rate with respect to the high speed moving mobile terminal can be improved. Also, since the base station control signal is reduced when the hand-off operation is carried out, the processing capability of the base station can be improved.

What is claimed is:

1. A mobile communication system comprising:

a plurality of radio base stations installed in each of plurality of cells, for providing mobile communication services;

a mobile switching center connected to said plurality of base stations, for controlling call connections in said mobile communication system, and a plurality of mobile terminals, each of the plurality of mobile terminals including an electric field level measurement stopping unit which stops an electric level measurement of forward control channels of adjoining base stations upon receiving a hand-off instruction signal transmitted from said mobile switching center.

2. The mobile communication system as claimed in claim 1 wherein:

each of said plurality of base stations includes an electric field level measurement result discarding unit which discards an electric field level measurement result signal transmitted from said mobile terminal after the hand-off instruction signal having been transmitted.

3. A hand-off method for a mobile communication system in which a hand-off control is performed based on a deterioration of an electric field level of a communication channel between a base station and a mobile terminal which has measured and reported electric field levels of forward control channels of adjoining base stations around a cell and the communication channel, said method comprising:

stopping measurement and reporting, in the mobile terminal, for the electric field levels of forward control channels of adjoining base stations and the communication channel upon receiving a hand-off instruction to another base station; and resuming measurement and reporting, in the mobile terminal, for the electric field levels of forward control channels of new adjoining base stations and new communication channel in accordance with an instruction by new base station of a hand-off destination.

4. A hand-off method for a mobile communication system structured by a plurality of radio base stations installed in each of plurality of cells, for providing mobile communication services, a mobile switching center connected to said plurality of base stations, for controlling call connections in said mobile communication system, and a plurality of mobile terminals moving around said plurality of cells and communicating with said base station in each of cells, said method comprising:

instructing said mobile terminal to measure and report each of electric field levels of forward control channels of adjoining base stations around a cell in which said mobile terminal is currently located, and to measure and report an electric field level of a communication channel used for a current communication with said base station, when a communication between said base station and said mobile terminal is commenced;

requesting a hand-off control to said mobile switching center from said base station when a deterioration of the electric field level of the communication channel having been detected by the electric field level measurement results reported by said mobile terminal;

instructing said mobile terminal to perform a hand-off operation to a base station, whose electric field level of the control channel contained in the electric field level measurement results reported by said mobile terminal is the highest level;

discarding the electric field level measurement results reported from said mobile terminal in said base station after the hand-off instruction having been, transmitted to said mobile terminal; and stopping the electric field level measurement and report having been performed in said mobile terminal, upon receipt by said mobile terminal of the hand-off instruction from said mobile switching center.

5. The hand-off method as claimed in claim 4, wherein said method further comprising:

resuming the electric field level measurement and report, by said mobile terminal, of forward control channels of adjoining base stations around a cell in which said mobile terminal is newly located, and a communication channel used for new communication with new base station of the hand-off destination, when an electric field level measurement request is instructed from said new base station after synchronization with said new base station.

* * * * *